Oct. 28, 1958  N. I. NELSON  2,857,821
FORMING GUIDE
Filed Jan. 17, 1958
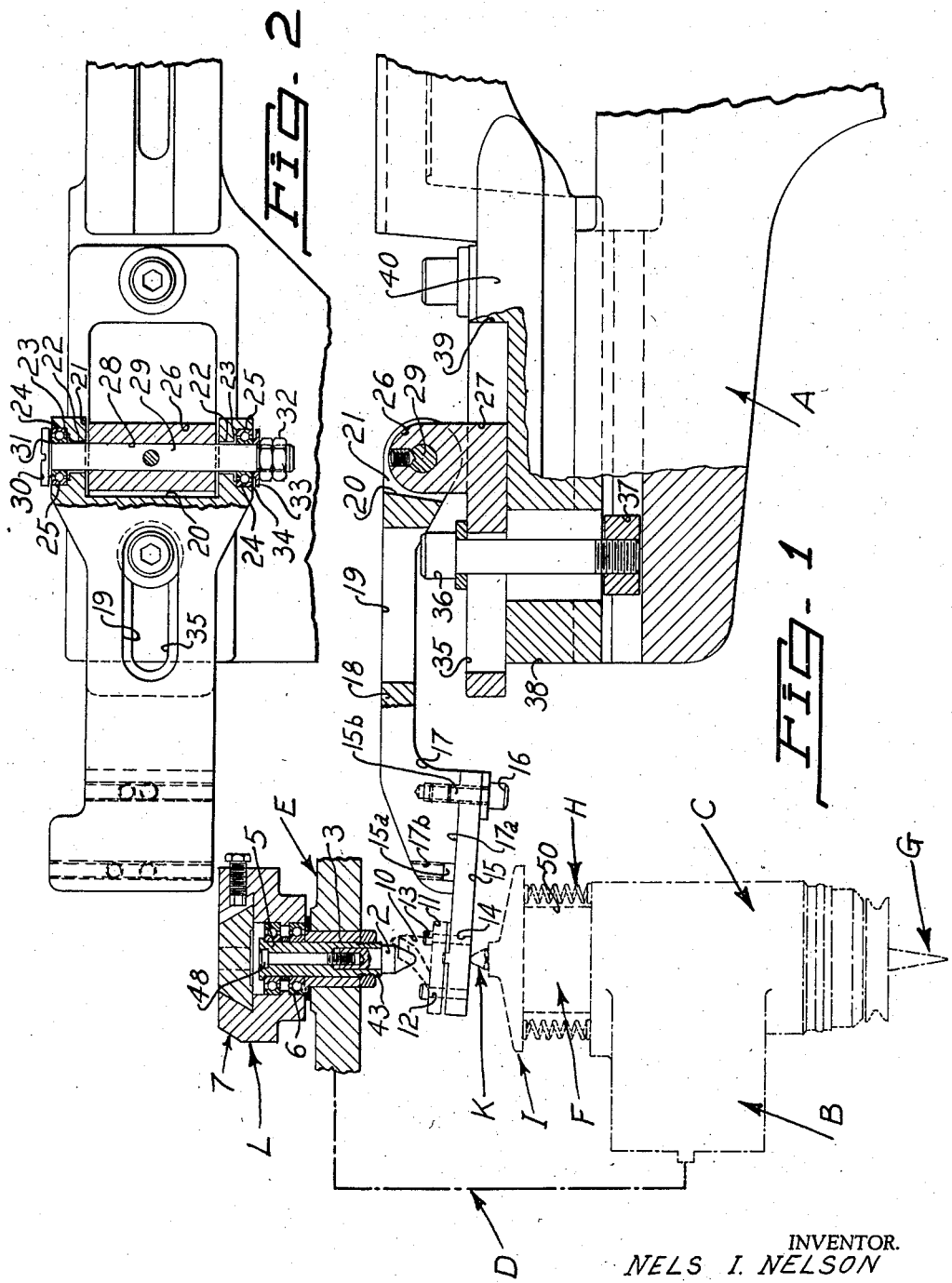
INVENTOR.
NELS I. NELSON
BY
*Robert Latta*
ATTORNEY

United States Patent Office 2,857,821
Patented Oct. 28, 1958

2,857,821

FORMING GUIDE

Nels I. Nelson, Racine, Wis., assignor to George Gorton Machine Co., Racine, Wis., a corporation of Wisconsin Application January 17, 1958, Serial No. 709,708

2 Claims. (Cl. 90—62)

This invention relates to improvements in forming guides for rendering a normally two-dimensional duplicating machine capable of performing three-dimensional work.

The invention contemplates, in particular, a forming guide which will facilitate cutting of steeply inclined surfaces. In the past a forming guide has been used which can be raised and lowered through an attached platform which travels vertically and rectilinearly on spaced vertically disposed pins. This is satisfactory in some cases but where the angle traced is very steep binding will occur on these pins and also considerable wear. The design of the present invention eliminates such binding and excess wear.

The object of the instant invention is to mount the platform holding the forming guide on an elongated arm, the free end of which is hingedly mounted on a horizontal pin, causing said arm and platform to freely rotate on said pin.

The invention resides further in certain structural details hereinafter set forth and illustrated in the attached drawing, in which:

Figure 1 is a side elevational view partially in cross-section of the floating forming guide and portions of associated apparatus with which such guide is utilized.

Figure 2 is a partial sectional plan view illustrating the hinged mounting.

It is contemplated that the invention will be utilized in connection with a machine tool of the type capable of functioning as a duplicating machine of the two-dimensional type wherein three-dimensional duplicating work becomes possible.

The type of machine tool with which the forming guide is associated is known in the art and forms no part of the invention and only portions of such machine are disclosed herein. Generally such a machine includes a knee portion A and mechanism carried thereby and capable of universal movement within a single plane—in this instance a horizontal plane. Such mechanism includes an arm to which spindle housing C is secured. The arm may be generally U-shaped (as indicated by the dotted line D) terminating with the extension E. Thus any movement of the spindle housing in any direction in a horizontal plane is reflected in the arm extension E in a manner known in the art.

The spindle housing assembly 50 carries the spindle F which is reciprocable therein and a cutting tool G is removably secured at the lower end of the spindle. A number of circumferentially spaced coil springs bear against the underside of the platform I to which the bearing nose K is secured.

A pointer 2 is received within a bushing 3 in locking stud 43 and is secured relative to the arm extension E by means of the nut 4. The arm E is shown associated with a portion of the mechanism (identified generally by the letter L) by which movement of the arm in a horizontal plane is effected—the upper end 5 having socket head screw 48 anchored therein, and being carried in bearings 6 mounted in the arm 7.

The floating forming guide, in the preferred form, has the pattern 10 to be duplicated formed integral with a flat base 11. The base has apertures 12 to receive studs 13 which are threaded into apertures 14 in one end of the forming guide platform 15. This platform 15 has parallel keys 15a and 15b formed hereon which are received in corresponding grooves formed in the underside of the offset base portion 17a of extension 17 of elongated floating arm 18. The platform 15 is removably secured to arm extension 17 by means of a socket head screw 16. The base 17a is provided with an additional threaded aperture 17b to receive alternately the socket screw 16 when certain ratio changes are necessary because of the change in size of the pattern 10. The arm 18 is of substantial width and is provided with a central elongated slot 19 for ready access to locking bolt 36. The free end of said arm is bifurcated forming a recess 20 of substantial proportions and spaced legs 21. These legs 21 have aligned openings 22 and respective communicating recesses 23 and counterbores 24. The counterbores 24 are arranged to receive bearings 25.

Interposed between legs 21 is an upstanding extension 26 of guide block 27. The extension 26 is provided with an elongated bore 28 in which hinge bolt 29 is mounted and secured. This bolt 29 hingedly mounts the legs 21 to the extension 26 with the head 30 of the bolt resting on bearing race 31. The other end of said bolt is threaded and receives lock nuts 32 bearing strongly on washer 33 interposed between bearing race 34 and the lock nuts 32.

The guide block 27 is provided with an elongated slot 35 to receive the locking bolt 36, the free end of which has mounted thereon a nut 37 which slides along the flanged undercut recess in knee 38. The guide block 27 is adjustably received within an enlarged recess 39 in the upper portion 40 of the knee.

In operation the arm A is moved in a horizontal plane as the cutting tool is moved about over the end product to be duplicated (not shown, but secured to a suitable table beneath the cutting tool). As the pointer 2 is moved about over the surface of the pattern 10, the cutting tool duplicates the pattern contour. The "3rd dimensional" or up and down movement of the cutting tool is accomplished as a result of the up and down swinging movement of the forming guide arm about the hinge pin 29 under the influence of the coil springs H which cause the spindle through its bearing nose K to continuously exert pressure on the underside of the platform 15.

In view of the fact that the forming guide arm moves up and down in an arcuate path, there is little tendency for any binding condition to occur in the up and down movement of the arm even though the surface on the pattern may include certain areas of steep inclination—that is inclinations approaching the vertical. It will be understood that since the forming guide arm does not move in a true rectilinearly vertical path, there will be a slight variance between the pattern and the reproduced end product; however, this factor is of little consequence and is, of course, taken into consideration at the outset. It will be further understood that the depth characteristics of the pattern to be duplicated are taken into consideration at the outset, since, the greater the up and down depth of the surface on the pattern, the greater the variance between pattern and end product as the forming guide arm swings further upward from horizontal. In practice the apparatus would be used in reproducing products having minimum depth characteristics to keep the variance factor at a minimum.

Changes in details may be made without departing from the spirit or scope of my invention, but what I claim is new is:

1. A forming guide comprising a pattern, a pattern base, a forming guide platform, said pattern secured to said base and said base temporarily mounted on one end of said platform, a slotted arm, one end of said arm mounting said platform, the other end of said arm adaptable to be hingedly mounted on a machine guide block.

2. A forming guide comprising a pattern, a pattern base, a forming guide platform, said pattern arranged integral with said base, said base secured to one end of said platform, a longitudinally extending arm member, one end of said arm bent and provided with a longitudinally extending extension, said platform mounted on said extension, the other end of said arm flaring outwardly and forming two leg members, aligned apertures in said legs adaptable to receive a hinge bolt on which said arm is rotatably mounted.

References Cited in the file of this patent

UNITED STATES PATENTS

| | | |
|---|---|---|
| 1,787,761 | Pomplum et al. | Jan. 6, 1931 |
| 2,000,838 | Gorton | May 7, 1935 |